United States Patent Office 2,843,582
Patented July 15, 1958

2,843,582

PREPARATION OF FINELY-DIVIDED CELLULOSE DERIVATIVES

Robert S. Voris, Lemont, Ill., assignor to Hercules Powder Company, Wilmington, Del., a corporation of Delaware No Drawing. Application April 8, 1954
Serial No. 421,983

5 Claims. (Cl. 260—223)

This invention relates to the preparation and use of film-forming cellulose derivatives. In one of its aspects this invention relates to the preparation of finely-divided cellulosic plastics and to the use of such cellulose derivatives in the preparation of plastic coatings or films.

The preparation of plastic coating compositions is normally accomplished by dissolving the plastic and modifiers in a suitable solvent, and films and coatings then are formed by evaporation of the solvent from a thin layer of the resulting composition. Serious economic limitations on this method are the solubility characteristics of the plastic in the solvent, the relatively high viscosity of the solutions, and the cost of solvent, whether lost or recovered. An alternate method, emulsification, still requires a solvent for the plastics.

In more recent years a new method of applying coatings of vinyl resin compositions has met with wide acceptance, first in Germany and Great Britain, and more recently in the United States. This procedure involves dispersion of the plastic, in finely-divided form, with or without plasticizer in a non-solvent medium, and coatings of such dispersions laid down on various substrata are coalesced to continuous films by application of heat and/or pressure. The disadvantages of solvent application as listed above are thus eliminated. This method of applying plastic coatings has been limited to vinyl resin compositions since the vinyl plastics by virtue of their preparation by emulsion polymerization are easily recovered in the finely-divided state at little added expense. No examples are known of the use of finely-divided cellulosic plastics in this manner because such cellulose derivatives are not so easily produced in a finely-divided state as are vinyl plastics. In fact, no satisfactory means of preparing cellulosic plastics in the same state of subdivision has been developed.

Two processes have been tried for the preparation of cellulosic plastics in a finely-divided form. They are mechanical grinding and spray drying of a solution of the plastic. Mechanical grinding is entirely inadequate for obtaining particle size suitable for use in film formation since it results in a powder of relatively large average particle size and irregularly shaped particles. Such a powder does not produce a homogeneous film, and the powder is characterized by a low bulk density which also makes efficient film formation difficult.

Spray drying a solution of the plastic produces better results than mechanical grinding, but it has also proved to be inadequate. The average particle size obtained by such a process is from 15 to 30 microns, with maximum sizes ranging from 65 to 180 microns in diameter. Microscopic examination of the product revealed that the solution-sprayed cellulosics are irregularly shaped, consisting of solid particles, hollow spheres, and fine threads. The bulk density is rather low, ranging from 0.06 to 0.14 g./ml. An additional drawback to this method is the relatively large amount of solvent required in the solution and to be recovered per pound of product.

Additionally, in my copending application, Serial No. 225,271, filed May 8, 1951, there is disclosed a method of preparing finely-divided film-forming plastics. In this method, cellulose derivative plastic is dispersed in a lacquer-in-water emulsion containing, in addition to the plastic and water, an emulsifying agent and a low boiling water-immiscible solvent for the plastic that can be emulsified without precipitation of the dispersed plastic. The resulting emulsion is then sprayed in fine droplet or mist form into a heated gaseous medium that acts as a desiccating vehicle. The resulting dried plastic is then recoverable in the form of fine particles or a powder.

Thus, there are two problems involved in producing fine particles of a cellulose derivative. One has to do with the difficulty encountered in producing the very fine particles required for commercial acceptance with a high degree of uniformity and the other has to do with the production of these very fine particles of cellulose derivative in a manner which is economically attractive to gain commercial acceptance.

In commercial production, fine particles of cellulose derivative plastic are required for use primarily in hydrosol, organosol, or plastisol coatings with other significant application being in the fields of paper and textile sizing, inks, flame-spraying and plastics. For these uses, fine particles of 1–50 micron size and preferably 1–15 micron size either in slurry or powder form are required. Therefore, it is a primary object of this invention to provide a process for the production of such particles which is simple, economical, reliable, and in which the particles possess a high degree of uniformity and stability. Other objects of the invention will appear hereinafter, the novel features and combinations being set forth in the appended claims.

Generally described, in accordance with this invention, it has been discovered that minute droplets of polymer solution in an emulsion thereof undergo a continuous conversion by rapid evaporation of solvent to give small particles dispersed in the water phase originally in the emulsion and that if the emulsion is formed into a thin layer for removal of liquid therefrom, the resulting fine particles possess a high degree of uniformity and stability. Furthermore, the resulting product may be collected in the form of a slurry for usage or it may be further dewatered by evaporation, either subsequently or integrally with the original evaporation to obtain a dry powder of the polymer in finely-divided form.

More specifically, in accordance with this invention, there is provided a process for preparing a finely-divided cellulose derivative which comprises forming an oil-in-water emulsion containing, in addition to water, a film-forming cellulose derivative of the group consisting of cellulose esters and ethers and mixtures thereof and a substantially water-immiscible volatile solvent for said derivative, forming a thin layer of the emulsion and removing liquid from the thin layer of said emulsion to obtain the cellulose derivative in finely-divided form.

The following examples serve to illustrate operations which may be carried out advantageously in practicing this invention.

*Example 1*

An emulsion containing 20 parts ethyl cellulose (type N-22), 72 parts methylene chloride, 8 parts 2B ethanol, 50 parts water and 0.1 part Aerosol OT (sodium dioctyl sulfosuccinate was poured into the valley of a drum dryer, 8-in. diameter, 10-in. width, the temperature of the steam-heated drums being 210–220° F. The drum speed was adjusted to produce complete drying, and the dry powder was removed by a doctor blade. The product rate was around 0.75–1.0 lb./sq. ft./hr. and the product was very fine and talcumlike. It had a bulk density of 0.33 g./ml. and an average particle size of .8 microns.

Example 2

An emulsion of the same composition as Example 1 was run into the valley of a 25 sq. ft. drum dryer, 2-ft. diameter, 2-ft. width, adjusted to a temperature of 210–220° F. After adjusting the drum speed to allow complete drying, the production rate of fine powder doctored off was between 0.75 and 1.0 lb./sq. ft./hr. The powder was very fine and gave a smooth continuous coating when evaluated in a hydrosol system. (This involves agitating 3 parts of finely-divided ethyl cellulose per part of Hercoflex 150 (octyl decyl phthalate) plasticizer in water, casting a film of this suspension onto aluminum foil, and heating in an oven at 180° C. for one minute.)

Example 3

An emulsion consisting of 12.5 parts of cellulose acetate (type FM-6), 70 parts of methylene chloride, 17.5 parts of 2B ethanol, 50 parts of water, and 0.125 part of Aerosol OT was run by means of splash feed onto a steam-heated drum dryer, 8-in. diameter by 10-in. width, 210–220° F. By adjusting the speed of rotation of the drum, it was possible to scrape off a dry powder which was very fine.

Example 4

An emulsion similar to that in Example 1 was run into a film evaporator (rated at 40 lb. water evaporation per hour at 25 in. vacuum) at the rate of 30 lb./hr. with a jacket temperature adjusted by means of hot water so as to produce a vapor temperature of 135° F. and a bottom product temperature of 170° F. A gentle draft was applied to the vapor condenser so as to sweep air up through the open bottom outlet; the rotor speed was around 3500 R. P. M. The bottoms consisted of a smooth creamy aqueous slurry free of methylene chloride containing some alcohol. Drying a film of this slurry left a deposit of fine powder solid ethyl cellulose of particle size 1 to 15 microns, average 3 microns. Other combinations of feed rates and lower jacket temperatures were equally satisfactory.

Example 5

An empulsion containing 10 parts of cellulose acetate (type LL-1), 72 parts methylene chloride, 18% 2B ethanol, 0.06% Aerosol OT, and 50 parts water was fed to a film evaporator at a rate of 10 lb./hr. The jacket temperature was 84° F. The evaporator, attached receiver, and vapor condenser were operated under vacuum of around 30 mm. absolute pressure. The rotor speed was about 2500 R. P. M. The product (83° F.) was a creamy slurry containing 7.6% solids of particle size 1–12 microns, average 3.

Other runs at somewhat different conditions gave products of 4–10% solids, free of methylene chloride and containing varying amounts of alcohol and averaging 1–4 microns. In general, a pressure of 15–90 mm., jacket at 30–35° C. and product temperatures below 100° F. were found satisfactory. It was also possible to operate with an open bottom outlet, feeding in air to aid the stripping of vapors.

Example 6

The same equipment as Example 4 was used with a feed rate of 25 lb./hr. of emulsion containing 10% cellulose acetate in the organic phase and 6.3% cellulose acetate in the emulsion, jacket temperature of 142° F., vapor temperature of 87° F., and product temperature of 94° F. The product particles averaged 15 microns in size.

Example 7

An emulsion containing 15 parts of RS-1/2 nitrocellulose, 55 parts methylene chloride, 29.8 parts methyl acetate, 0.2 part Aerosol OT, and 50 parts water was fed to the same unit as in Example 5, introducing air into a bottom tap in order to facilitate solvent stripping and water injection to minimize any hazards. Conditions were: 109° F. jacket temperature, feed rate 90 cc./min., water rate 50 cc./min., rotor speed 3200 R. P. M., overhead temperature 92° F., bottom temperature 90° F.

The particles of nitrocellulose in the product slurry (4% solids) were 1–5 microns in size averaging 2 microns. After careful drying, they gave a German heat stability test of 28 minutes showing very little degradation during processing.

Example 8

The same equipment as Example 4 was operated on a feed emulsion containing 20 parts ethyl cellulose (type N-22), 72 parts methylene chloride, 8 parts 2B ethanol, 0.1 part Aerosol OT, and 60 parts water. At a feed rate of 31 lb./hr. and 77° C. jacket temperature, and 3600 R. P. M. rotor speed and no vacuum or draft, the bottoms temperature and overhead temperature were 167° F. and 99° F., respectively. A fine creamy slurry was obtained and operation was smooth.

In carrying out the preceding examples, the emulsion was formed into a thin layer in each case. The thin layer formed using the various materials and conditions was from about 0.001 to about 0.01 inch in thickness.

Generally, in accordance with this invention, the emulsions are prepared as follows: A 10–20% solution by weight of ethyl cellulose (EC) or cellulose acetate (CA) and 0.1–0.25% emulsifier (such as Aerosol OT) in 80/20 to 95/5 methylene chloride/ethanol is made up; to this is added with agitation about 0.5–1.0 part of water per part of lacquer solution to invert the initial water-in-oil emulsion to a smooth oil-in-water emulsion. This emulsion may be further homogenized or colloided to yield a more uniform emulsion, if desired. Emulsions containing ethyl cellulose having an ethoxyl content between 46.8–48.5% and a viscosity between 20–24 centipoises in 5% concentration solution have been found quite satisfactory and are preferred. Emulsions containing cellulose acetate having between 55.1–56.2% acetic acid and a viscosity between 35 to 55 secs. and cellulose acetate having between 52.5–53.5% acetic acid and a viscosity between 30–60 secs., as measured by the falling ball method, have been found quite satisfactory. However, for nitrocellulose (NC) a different solvent system is used to obtain the proper balance of solubility and volatility. For example, when using a ½ second viscosity type nitrocellulose as measured by the falling ball method, a 7–15% solution in 55/35 methylene chloride/methyl or ethyl acetate has been found quite satisfactory.

The type of drum dryer found especially effective for production of powders in accordance with this invention is the twin-drum dryer. With this dryer the rolls rotate away from each other at the top where the valley is formed and the dried product is removed, after traveling as far around the drum as possible, by a doctor knife set close to the drum surface from which the dried material drops into a chute or hopper. It has been found that EC emulsions are readily evaporated to a fine powder by means of the valley feed to the twin-drum dryer heated to a temperature between 210–220° F. It has been found further that CA emulsions can be processed to give very fine powder by spray feeding the emulsion to the valley of the twin dryer. The type of film evaporator found especially effective for production of an aqueous slurry of the finely-divided particles is the Turba-Film Evaporator. In this device the material to be evaporated is fed into an evaporating section where it is whirled against the wall by rotor blades. This forms a thin turbulent film, centrifugally held to the wall, which spins in a gravity flow through the chamber and out. The vapors rise into a separating section disposed above the evaporating section where rotor blades beat out any entrained droplets and force them back through the evaporating section. The form-breaking characteristics of the rotor blades are very effective for the particular process of this invention.

For commercial purposes, it is desirable to ship finely-divided NC in water-wet or alcohol-wet form. Thus, film evaporation in accordance with this invention results in a desirable and highly concentrated slurry which from the standpoint of pourability may be as high as 50% total solids and from the standpoint of shipping regulations may be as high as 70% total solids or less. Because of the continuous processing of a small quantity of feed at any one time, the process is safe, easy to control, and gives a very stable product. This also applies to finely-divided EC and CA where particle size control is easily attained and the aqueous slurry may be passed to a drum or spray dryer for obtaining the product in dry powder form.

From the foregoing, it will be apparent that the actual temperatures employed for evaporation are determined by the specific system employed and the form of end product desired. Furthermore, the solvent that is employed in the emulsion should be substantially water-immiscible. However, a combination of water-miscible and water-immiscible solvents may be used, but the ratio of solvents should be such that the resulting solvent formed is substantially water-immiscible. When using a combination of solvents, it is preferable that the water-immiscible solvent be lower boiling than the water-miscible solvent so that the cellulose derivative is precipitated into a lean solvent mixture. In addition to the solvents set out in the examples, other solvents can be used. For example, ethyl acetate, ethyl chloride, ethylene dichloride, appropriate hydrocarbons and the like are suitable water-immiscible solvents that can be used alone or in combination with water-soluble solvents such as methyl acetate, acetone and the like. With an ethyl cellulose or cellulose acetate formulation, it is preferred to employ a solvent containing from 80 to 95 parts by weight of methylene chloride and from 20 to 5 parts by weight of a lower aliphatic alcohol such as methanol, ethanol, propanol, and butanol.

In preparing the premix before colloiding, several schemes are operable: (1) add water and emulsifier to the lacquer phase, (2) add water to the lacquer phase containing emulsifier, (3) add solvent to a mixture of water, plastic and emulsifier, or (4) add plastic to an emulsion of solvent and water.

The process of the invention is generally applicable to cellulosic plastics compositions. Among the applicable cellulosics are single esters, such as cellulose acetate, cellulose propionate, cellulose butyrate, cellulose benzoate, cellulose stearate and cellulose crotonate, and the like; mixed esters, such as cellulose acetate propionate, cellulose acetate butyrate, cellulose acetate benzoate, cellulose acetate phthalate, cellulose acetate crotonate, cellulose acetate sorbate, and the like; ethers such as ethyl cellulose, benzyl cellulose, and the like; and mixed ester-ethers, such as ethyl hydroxyethyl cellulose, hydroxyethyl cellulose acetate, ethyl cellulose acetate, ethyl cellulose crotonate, benzyl cellulose acetate, and the like.

It will be apparent that powdered cellulose derivatives as described in the foregoing examples may include pigments, plasticizers and other modifiers which are conventionally employed in such materials. The products of this process are particularly useful in the application of plasticized cellulosic plastic coatings without recourse to the expense or hazards associated with the use of solvents. This may be accomplished by utilizing the finely-divided cellulose derivatives, produced as shown, as dispersions in water (hydrosols) with or without suitable plasticizers, as dispersions in nonsolvent organic media (organosols) with or without suitable plasticizers, and as dispersions in certain selected plasticizers (plastisols).

The preparation of organosols and hydrosols with cellulose derivatives has been known to the art, though no commercial exploitation of these methods is known, probably due to the deficiencies of the powders available in the prior art. A drawback in the prior art in the use of plasticized cellulosic sols was that the plasticizer, when employing the prior art powders, had to be soluble in the dispersing medium or else added in sufficient amounts to cause gelation of the entire sol. With the powders of this invention, however, it is both possible and practical to disperse the finely-divided cellulose derivatives in a nonsolvent for the plasticizer without obtaining a gel. The elimination of the necessity for a solvent for the plasticizer eliminates the cost and risk inherent in its use. By obtaining practical and permanent plasticized dispersions without the necessity of forming gels, greater flexibility in permissible film compositions and in means of applying the compositions is now possible.

Only simple stirring is required to disperse the plasticizer in the finely-divided cellulose derivative. It is advantageous to form first a slurry of the finely-divided cellulose derivative in the dispersion medium and then stir in plasticizers and other modifiers. If the dispersion medium is added to a paste of the cellulosic and plasticizer, agglomerates often result. Pebble-milling the dispersion results in lowered viscosity, some reduction in particle size and an improved homogeneity of the fused film, but it is not required. Films cast from these dispersions are continuous, flexible, and have excellent gloss.

In a similar manner plastisols can be formed with the finely-divided cellulose derivatives of this invention by mixing the derivative with a plasticizer which is a nonsolvent for the derivative at room temperature but which is a solvent for the derivative at elevated temperatures. For example, a plastisol can be prepared by dissolving chlorinated diphenyl in mineral oil, after which the plasticizer is mixed with finely-divided spray-dried ethyl cellulose. The resulting thick paste is applied to a tin plate and fused for 30 secs. at 180° C. The resulting coating is a tough, plastic film.

Choice of plasticizers for these dispersions is quite critical. Stable dispersions cannot be prepared with plasticizers in which the cellulose derivatives are quite soluble at room temperature. Also, the plastic must be soluble in the plasticizer at the temperature of fusing the film. The permissible range of plasticizer content for the dispersions is variable, but from the standpoint of film properties, it is desirable for the dispersion to contain no more than 50% but not less than 10% plasticizer, based on total solids.

The hydrosols produced as described above are dilatant to varying degrees but this property can be eliminated by dilution of the dispersion. Dilution, however, increases the settling tendency of the suspended particles. It has been found that addition of 0.1 to 0.5% (based on total solids) of high viscosity methyl cellulose decreases both dilatancy and settling. In ethyl cellulose hydrosols this treatment eliminates both settling and dilatancy as deterrents to application of films. Cellulose acetate hydrosols which still exhibit some settling can be stabilized by the further addition of 0.05 to 0.1% (based on total solids) of sodium silicate. Such modified hydrosols appear to gel on storage, but no settling occurs, and only mild agitation is required to restore this gel-like dispersion to a free-flowing fluid.

Fusion of films, prepared as described above, can be accomplished in forced-draft ovens, by infrared lamps or heaters, and in the case of foil coatings, by conduction heating. Other means known to the art may be used. Coatings on porous substrata can be dried and fused in one heating operation. On nonporous substrata it is advisable to heat the films at a temperature below the fusion temperature to drive off water without fusion, and then this step is followed with the normal fusion cycle. This procedure lessens the chances of blistering of applied films. In the case of hydrosols and organosols, the coatings can be applied by such commercial means as reverse roll or blade coaters or spray application.

The extremely fine particle size made possible by this invention improves the homogeneity of the fused films and renders the films more readily fusible. The novel and useful means of adding plasticizers to the film-coating composition is also attributable to the improved particle properties of the finely-divided cellulose derivatives as the successful dispersion of plasticizers in the film-coating compositions seems to be due to absorption of plasticizer on the finely-divided cellulose derivative particles.

In addition, this invention provides a process for the production of fine particles of cellulose derivatives which is simple, economical, reliable, and in which the particles possess a high degree of uniformity and stability.

This application is a continuation-in-part of my co-pending application, Serial No. 225,271, filed May 8, 1951, now U. S. Patent 2,740,723.

What I claim and desire to protect by Letters Patent is:

1. A process for preparing a finely-divided cellulose derivative which comprises preparing a lacquer solution by dissolving a film-forming cellulose derivative of the group consisting of cellulose esters and ethers and mixtures thereof in substantially water-immiscible volatile solvent which boils below the boiling point of water, emulsifying the lacquer solution thus formed in an aqueous phase consisting of water and an emulsifying agent to form a lacquer-in-water emulsion, forming a thin layer of the emulsion on a surface heated to an elevated temperature below the boiling point of water, and evaporating the volatile solvent from the emulsified lacquer without substantial evaporation of water from said emulsion to precipitate the cellulose derivative in finely-divided form in the water of the emulsion.

2. A process for preparing a finely-divided cellulose derivative which comprises preparing a lacquer solution by dissolving a film-forming cellulose derivative of the group consisting of cellulose esters and ethers and mixtures thereof in substantially water-immiscible volatile solvent which boils below the boiling point of water, emulsifying the lacquer solution thus formed in an aqueous phase consisting of water and an emulsifying agent to form a lacquer-in-water emulsion, forming a thin layer of the emulsion on a surface heated to an elevated temperature below the boiling point of water, evaporating the volatile solvent from the emulsified lacquer without substantial evaporation of water from said emulsion to precipitate the cellulose derivative in finely-divided form in the water of the emulsion, and then de-watering the aqueous dispersion of finely-divided cellulose derivative thus formed by evaporation to obtain a dry powder of the cellulose derivative in finely-divided form.

3. The process according to claim 1 wherein the cellulose derivative is cellulose acetate.

4. The process according to claim 1 wherein the cellulose derivative is ethyl cellulose.

5. The process according to claim 1 wherein the cellulose derivative is nitrocellulose.

References Cited in the file of this patent

UNITED STATES PATENTS

| | | |
|---|---|---|
| 1,936,989 | Peters | Nov. 28, 1933 |
| 2,114,491 | Hollabaugh | Apr. 19, 1938 |
| 2,272,152 | Moore | Feb. 3, 1942 |
| 2,510,834 | Phillips | June 6, 1950 |